United States Patent [19]
McDonald et al.

[11] Patent Number: 6,059,691
[45] Date of Patent: *May 9, 2000

[54] METHOD AND APPARATUS FOR OPERATING A CLUTCH IN AN AUTOMATED MECHANICAL TRANSMISSION

[75] Inventors: Anthony B. McDonald, Perrysburg; Anand C. Patel, Sylvania; Peter T. Szymanski, Toledo; James A. Wheeler, Perrysburg, all of Ohio

[73] Assignee: Transmisiones TSP, S.A. de C.V., Mexico

[ * ] Notice: This patent issued on a continued prosecution application filed under 37 CFR 1.53(d), and is subject to the twenty year patent term provisions of 35 U.S.C. 154(a)(2).

[21] Appl. No.: 08/843,447

[22] Filed: Apr. 16, 1997

[51] Int. Cl.$^7$ .................................................. B60K 41/02
[52] U.S. Cl. .................................................. 477/176
[58] Field of Search ..................................... 477/175, 176

[56] References Cited

U.S. PATENT DOCUMENTS

| | | | |
|---|---|---|---|
| 4,766,544 | 8/1988 | Kurihara et al. | 477/176 |
| 5,050,714 | 9/1991 | Kurihara et al. | 477/176 |
| 5,056,639 | 10/1991 | Petzold et al. | 477/176 |
| 5,275,267 | 1/1994 | Slicker | 477/176 |
| 5,277,286 | 1/1994 | Yamamoto et al. | 477/175 |
| 5,403,249 | 4/1995 | Slicker | 477/176 |
| 5,630,773 | 5/1997 | Slicker et al. | 477/176 |
| 5,679,099 | 10/1997 | Kato et al. | 477/176 |
| 5,704,872 | 1/1998 | Kosik et al. | 477/176 |

*Primary Examiner*—Dirk Wright
*Attorney, Agent, or Firm*—MacMillan, Sobanski & Todd, LLC

[57] ABSTRACT

An apparatus and method for controlling the operation of a clutch in a partially or fully automated mechanical transmission which is responsive to the actual speed of the vehicle engine for varying the engagement rate of release bearing during reengagement of the clutch. The apparatus includes an electronic controller which initially sets a desired speed for the vehicle engine during the shifting process, determines a rate of engagement movement of a release bearing of the clutch, and actuates appropriate valves to initiate the gradual engagement of the clutch. The electronic controller sets a first lower engine speed threshold and a second lower engine speed threshold. The magnitude of the first lower engine speed threshold may vary with the amount of depression of an accelerator pedal of the vehicle. If the actual speed of the engine remains above both the first lower engine speed threshold and the second lower engine speed threshold, the engagement process is continued without interruption. If the actual speed of the engine drops below the first lower engine speed threshold but remains above the second lower engine speed threshold, the release bearing is held in its current position until the actual speed of the engine recovers above the first lower engine speed threshold. If the actual speed of the engine drops below both the first lower engine speed threshold and the second lower engine speed threshold, the engagement process is aborted, and the release bearing is returned to the disengaged position until the actual speed of the engine recovers above an engagement re-start speed threshold.

17 Claims, 3 Drawing Sheets

METHOD AND APPARATUS FOR OPERATING A CLUTCH IN AN AUTOMATED MECHANICAL TRANSMISSION

BACKGROUND OF THE INVENTION

This invention relates in general to vehicle transmissions and in particular to a method and apparatus for automatically controlling the operation of a clutch for use with an automated mechanical transmission in a vehicle drive train assembly.

In virtually all land vehicles in use today, a transmission is provided in a drive train between a source of rotational power, such as an internal combustion or diesel engine, and the driven axle and wheels of the vehicle. A typical transmission includes a case containing an input shaft, an output shaft, and a plurality of meshing gears. Means are provided for connecting selected ones of the meshing gears between the input shaft and the output shaft to provide a desired speed reduction gear ratio therebetween. The meshing gears contained within the transmission case are of varying size so as to provide a plurality of such gear ratios. By appropriately shifting among these various gear ratios, acceleration and deceleration of the vehicle can be accomplished in a smooth and efficient manner.

To facilitate the operation of the transmission, it is well known to provide a clutch between the vehicle engine and the transmission. When the clutch is engaged, the transmission is driven by the vehicle engine to operate the vehicle at a selected gear ratio. To shift the transmission from a first gear ratio to a second gear ratio, the clutch is initially disengaged such that power is not transmitted from the vehicle engine to the transmission. This allows the gear shifting operation to occur within the transmission under a non-torque loading condition to prevent undesirable clashing of the meshing gear teeth. Thereafter, the clutch is re-engaged such that power is transmitted from the vehicle engine to the transmission to operate the vehicle at the second gear ratio.

A typical structure for a vehicle clutch includes a cover which is connected to a flywheel secured to the end of the output shaft of the vehicle engine for rotation therewith. A pressure plate is disposed within the clutch between the cover and the flywheel. The pressure plate is connected for rotation with the flywheel and the cover, but is permitted to move axially relative thereto. Thus, the flywheel, the cover, and the pressure plate are all constantly rotatably driven by the vehicle engine. Between the flywheel and the pressure plate, a driven disc assembly is disposed. The driven disc assembly is supported on the input shaft of the transmission for rotation therewith, but is permitted to move axially relative thereto. To engage the clutch, the pressure plate is moved axially toward the flywheel to an engaged position, wherein the driven disc assembly is frictionally engaged between the flywheel and the pressure plate. As a result, the driven disc assembly (and the input shaft of the transmission upon which it is supported) are driven to rotate with the flywheel, the cover, and the pressure plate. To disengage the clutch, the pressure plate is moved axially away from the flywheel to a disengaged position. When the pressure plate is moved axially to this disengaged position, the driven disc assembly is not frictionally engaged between the flywheel and the pressure plate. As a result, the driven disc assembly (and the input shaft of the transmission upon which it is supported) are not driven to rotate with the flywheel, the cover, and the pressure plate.

To effect such axial movement of the pressure plate between the engaged and disengaged positions, most vehicle clutches are provided with a release assembly including a generally hollow cylindrical release sleeve which is disposed about the output shaft of the clutch. The forward end of the release sleeve extends within the clutch and is connected through a plurality of levers or other mechanical mechanism to the pressure plate. In this manner, axial movement of the release sleeve causes corresponding axial movement of the pressure plate between the engaged and disengaged positions. Usually, one or more engagement springs are provided within the clutch to urge the pressure plate toward the engaged position. The engagement springs typically react between the release sleeve and the cover to normally maintain the clutch in the engaged condition. The rearward end of the release sleeve extends outwardly from the clutch through a central opening formed through the cover. Because the release sleeve is connected to the cover and the pressure plate of the clutch, it is also constantly driven to rotate whenever the vehicle engine is operating. Thus, an annular release bearing is usually mounted on the rearward end of the release sleeve. The release bearing is axially fixed on the release sleeve and includes an inner race which rotates with release sleeve, an outer race which is restrained from rotation, and a plurality of bearings disposed between the inner race and the outer race to accommodate such relative rotation. The non-rotating outer race of the release bearing is typically engaged by an actuating mechanism for moving the release sleeve (and, therefore, the pressure plate) between the engaged and disengaged positions to operate the clutch.

In a conventional mechanical transmission, both the operation of the clutch and the gear shifting operation in the transmission are performed manually by an operator of the vehicle. For example, the clutch can be disengaged by depressing a clutch pedal located in the driver compartment of the vehicle. The clutch pedal is connected through a mechanical linkage to the outer race of the release bearing of the clutch such that when the clutch pedal is depressed, the pressure plate of the clutch is moved from the engaged position to the disengaged position. When the clutch pedal is released, the engagement springs provided within the clutch return the pressure plate from the disengaged position to the engaged position. Similarly, the gear shifting operation in the transmission can be performed when the clutch is disengaged by manually moving a shift lever which extends from the transmission into the driver compartment of the vehicle. Manually operated clutch/transmission assemblies of this general type are well known in the art and are relatively simple, inexpensive, and lightweight in structure and operation. Because of this, the majority of medium and heavy duty truck clutch/transmission assemblies in common use today are manually operated.

More recently, however, in order to improve the convenience of use of manually operated clutch/transmission assemblies, various structures have been proposed for partially or fully automating the shifting of an otherwise manually operated transmission. In a partially or fully automated manual transmission, the driver-manipulated clutch pedal may be replaced by an automatic clutch actuator, such as a hydraulic or pneumatic actuator. The operation of the automatic clutch actuator can be controlled by an electronic controller or other control mechanism to selectively engage and disengage the clutch without manual effort by the driver. Similarly, the driver-manipulated shift lever may also be replaced by an automatic transmission actuator, such as a hydraulic or pneumatic actuator which is controlled by an electronic controller or other control mechanism to select and engage desired gear ratios for use.

In both manually operated transmissions and in partially or fully automated manual transmissions, one of the most difficult operations to perform is to initially launch the vehicle from at or near a stand-still. This is because the force required to overcome the inertia of the vehicle is the greatest when attempting to initially accelerate the vehicle from at or near zero velocity. This relatively large amount of inertial force results in a relatively large load being placed on the vehicle engine when the clutch is engaged during a vehicle launch. Thus, the movement of the release bearing from the disengaged position to the engaged position must be carefully controlled during the initial launch of the vehicle to prevent the engine from stalling and to avoid undesirable sudden jerking movement of the vehicle. Although the same considerations are generally applicable when re-engaging the clutch during subsequent shifting operations in the higher gear ratios of the transmissions, the control of the movement of the release bearing from the disengaged position to the engaged position has been found to be less critical when shifting among such higher gear ratios because a much lesser force is required to overcome the inertia of the vehicle when the vehicle is already moving.

To address these considerations, the total movement of the release bearing from the disengaged position to the engaged position can be divided into three ranges of movement. The first range of movement is from the disengaged position to a first intermediate position (referred to as the transition point). The transition point is selected to be relatively near, but spaced apart from, the position of the release bearing at which the driven disc assembly of the clutch is initially engaged by the flywheel and the pressure plate. Thus, during this first range of movement (referred to as the transition movement), the clutch is completely disengaged, and no torque is transmitted through the clutch to the transmission. The second range of movement is from the transition point to a second intermediate position (referred to as the kiss point). The kiss point is the position of the release bearing at which the driven disc assembly is initially engaged by the flywheel and the pressure plate. Thus, during this second range of movement (referred to as the approach movement) from the transition point to the kiss point, the clutch is disengaged until the release bearing reaches the kiss point, at which point the first measurable amount of torque is transmitted through the clutch to the transmission. The third range of movement of the release bearing is from the kiss point to the engaged position. The engaged position is the position of the release bearing at which the driven disc assembly is completely engaged by the flywheel and the pressure plate. Thus, during this third range of movement (referred to as the engagement movement), the clutch is gradually engaged so as to increase the amount of torque which is transmitted through the clutch to the transmission from the first measurable amount at the kiss point to the full capacity of the clutch at the engaged position.

As mentioned above, during the engagement movement of the release bearing from the kiss point to the engaged position, the clutch is gradually engaged so as to increase the amount of torque which is transmitted through the clutch to the transmission from the first measurable amount at the kiss point to the full capacity of the clutch at the engaged position. Thus, although it is desirable that this engagement movement of the release bearing be accomplished as quickly as possible, it is still important to engage the clutch smoothly to prevent the engine from stalling and to avoid undesirable sudden jerking movement of the vehicle.

In the past, the rate of engagement movement of the release bearing (referred to as the engagement rate) has been determined as a function of the difference between the rotational speeds of the input member and the output member of the clutch. However, it has been found that such a comparison of input and output member rotational speeds may not be well suited for all of the varying conditions under which the vehicle may be operated. For example, it is desirable to insure that the actual speed of the vehicle engine does not drop below a predetermined level which might result in a stall condition. Thus, it would be desirable to provide an apparatus and method for controlling the operation of a clutch in a partially or fully automated mechanical transmission which is responsive to the actual speed of the vehicle engine for varying the engagement rate of release bearing during re-engagement of the clutch.

SUMMARY OF THE INVENTION

This invention relates to an apparatus and method for controlling the operation of a clutch in a partially or fully automated mechanical transmission which is responsive to the actual speed of the vehicle engine for varying the engagement rate of release bearing during re-engagement of the clutch. The apparatus includes an electronic controller which initially sets a desired speed for the vehicle engine during the shifting process, determines a rate of engagement movement of a release bearing of the clutch, and actuates appropriate valves to initiate the gradual engagement of the clutch. The electronic controller sets a first lower engine speed threshold and a second lower engine speed threshold. The magnitude of the first lower engine speed threshold may vary with the amount of depression of an accelerator pedal of the vehicle. If the actual speed of the engine remains above both the first lower engine speed threshold and the second lower engine speed threshold, the engagement process is continued without interruption. If the actual speed of the engine drops below the first lower engine speed threshold but remains above the second lower engine speed threshold, the release bearing is held in its current position until the actual speed of the engine recovers above the first lower engine speed threshold. If the actual speed of the engine drops below both the first lower engine speed threshold and the second lower engine speed threshold, the engagement process is aborted, and the release bearing is returned to the disengaged position until the actual speed of the engine recovers above an engagement re-start speed threshold.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
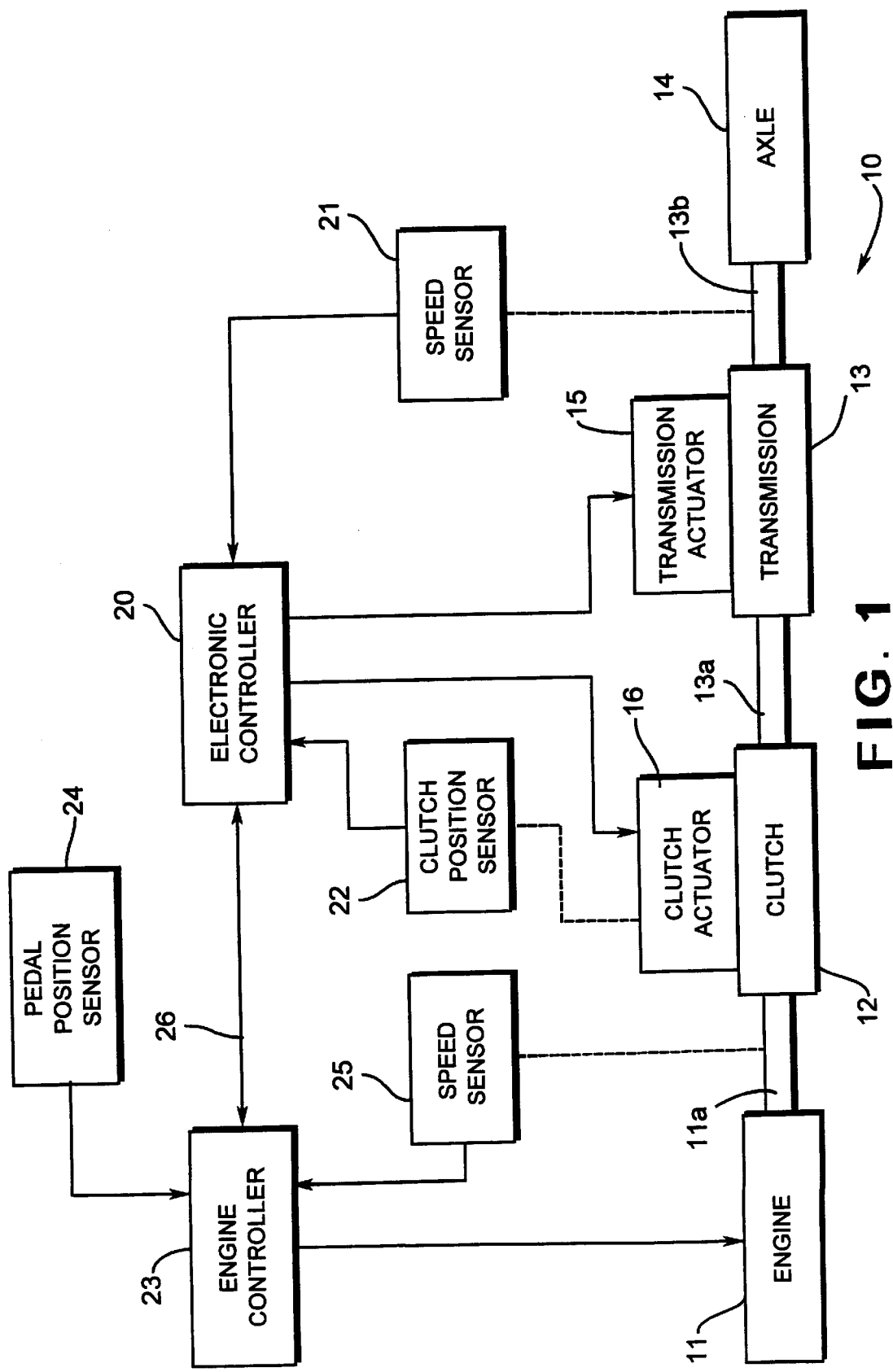
FIG. 1 is a block diagram of a vehicle drive train assembly including an electronic controller in accordance with this invention.

Referring now to the drawings, there is illustrated in FIG. 1 a block diagram of a vehicle drive train assembly, indicated generally at 10. The drive train assembly 10 includes a conventional engine 11 or other source of rotational power. The engine 11 is connected through an output shaft 11*a*, such as a crankshaft of the engine 11, to a clutch 12. The clutch 12 is also conventional in the art and functions to selectively connect the output shaft 11*a* of the engine 11 to an input shaft 13*a* of a transmission 13. The transmission 13 contains a plurality of meshing gears (not shown) which are selectively connected between the input shaft 13*a* and an output shaft 13*b*. The meshing gears contained within the transmission 13 are of varying size so as to provide a plurality of such gear ratios. By appropriately shifting among these various gear ratios, a desired speed reduction gear ratio can be provided between the input shaft 13*a* and the output shaft 13*b*. Consequently, acceleration and deceleration of the vehicle can be accomplished in a smooth and efficient manner. The output shaft 13*b* is connected to a conventional axle assembly 14. The axle assembly 14 includes one or more wheels which are rotatably driven by the engine 11 whenever the clutch 12 and the transmission 13 are enngaged. This general structure for the drive train assembly 10 is well known in the art.

The illustrated transmission 13 may be either a partially or fully automated mechanical transmission. In a typical partially automated manual transmission, a driver-manipulated shift lever (not shown) engages and moves certain ones of a plurality of shift rails contained within the transmission to engage a first set of gear ratios for use. However, an automatically shifting transmission actuator 15 is provided on the transmission 13 to engage and move the remaining shift rails to engage a second set of gear ratios for use. For example, it is known to provide a partially automated manual transmission wherein the lower gear ratios are manually selected and engaged by the vehicle driver using the shift lever, while the higher gear ratios are automatically selected and engaged by the transmission actuator 15. One example of a typical partially automated manual transmission of this general structure is disclosed in detail in U.S. Pat. No. 5,450,767, owned by the assigned of this application. The disclosure of that patent is incorporated herein by reference. In a fully automated manual transmission, the driver-operated shift lever is usually replaced by the transmission actuator 15. The transmission actuator 15 functions to shift all of the shift rails contained within the transmission so as to select and engage all of the available gear ratios. The above-referenced patent discusses the adaptability of the disclosed partially automated transmission actuator 15 to fully automate the shifting of the transmission disclosed therein.

To facilitate the automatic shifting of the transmission 15, the clutch 12 is provided with a clutch actuator 16. The structure and operation of the clutch actuator 16 will be discussed further below. Briefly, however, the clutch actuator 16 is provided to replace a driver-manipulated clutch pedal so as to partially or fully automate the operation of the clutch 12. The clutch actuator 16 is effective to operate the clutch 12 in either an engaged or disengaged mode. When the clutch 12 is engaged, the transmission 13 is driven by the vehicle engine 11 to operate the vehicle at a selected gear ratio. To shift the transmission 13 from a first gear ratio to a second gear ratio, the clutch 12 is initially disengaged such that power is not transmitted from the vehicle engine 11 to the transmission 13. This allows the transmission actuator 15 to effect a gear shifting operation within the transmission 13 under a non-torque loading condition to prevent undesirable clashing of the meshing gear teeth. Thereafter, the clutch 12 is re-engaged such that power is transmitted from the vehicle engine 11 to the transmission 13 to operate the vehicle at the second gear ratio.

The operation of the clutch actuator 16 and the transmission actuator 15 are controlled by an electronic controller 20. The electronic controller 20 can be embodied as any conventional microprocessor or similar computing apparatus which can be programmed to operate the clutch actuator 16 (to effect automatic disengagement and engagement of the clutch 12) and the transmission actuator 15 (to effect automatic shifting of the transmission 13 when the clutch 12 is disengaged) as described above. The operation of the electronic controller 20 will be described in detail below. A transmission output shaft speed sensor 21 provides an input signal to the electronic controller 20. The transmission output shaft speed sensor 21 is conventional in the art and is adapted to generate an electrical signal which is representative of the actual rotational speed of the output shaft 13*b* of the transmission 13. A clutch position sensor 22 also provides an input signal to the electronic controller 20. The structure and operation of the clutch position sensor 22 will be described below.

An engine controller 23 is provided to control the operation of the vehicle engine 11. The engine controller 23 can also be embodied as any conventional microprocessor or similar computing apparatus which can be programmed to operate the engine 11 in a desired manner. Primarily, the engine controller 23 controls the operation of the engine 11 in response to an input signal generated by an accelerator pedal position sensor 24. The accelerator pedal position sensor 24 is conventional in the art and is adapted to generate an electrical signal which is representative of the actual position of the accelerator pedal (not shown) of the vehicle. As is well known, the accelerator pedal is physically manipulated by the foot of the driver of the vehicle to control the operation thereof. The accelerator pedal is depressed by the driver when it is desired to increase the speed of the engine 11 and move the vehicle. Conversely, the accelerator pedal is released when it is desired to decrease the speed of the engine 11 to slow or stop such movement of the vehicle. Thus, the engine controller 23 controls the speed of the engine 11 in response to the signal from the accelerator pedal position sensor 24 so as to operate the vehicle as desired by the driver. The accelerator pedal position sensor 24 may, if desired, be replaced by a throttle position sensor (not shown) or other driver-responsive sensor which generates a signal which is representative of the desired speed or mode of operation of the vehicle. A second input to the engine controller 23 is an engine output shaft speed sensor 25. The engine output shaft speed sensor 25 is conventional in the art and is adapted to generate an electrical signal which is representative of the actual rotational speed of the output shaft 11*a* of the engine 11.

The electronic controller 20 and the engine controller 23 communicate with one another over a data bus line 26 extending therebetween. In a manner which is generally conventional in the art, the electronic controller 20 and the engine controller 23 are programmed to communicate and cooperate with one another to so as to control the operation of the vehicle in a manner desired by the driver of the vehicle. Specifically, the electronic controller 20 and the engine controller 23 are effective to control the operation of the engine 11, the clutch 12, and the transmission 13 in such a manner that the vehicle can be started and stopped solely by physical manipulation of the accelerator and brake pedals, similar to a conventional automatic transmission in a passenger car. To accomplish this, the signals from the accelerator pedal position sensor 24 and the engine output shaft speed sensor 25 are available to the electronic controller 20 over the data bus line 26. Alternatively, the signals from the accelerator pedal position sensor 24 and the engine output shaft speed sensor 25 can be fed directly to the electronic controller 20.

Figure 2:
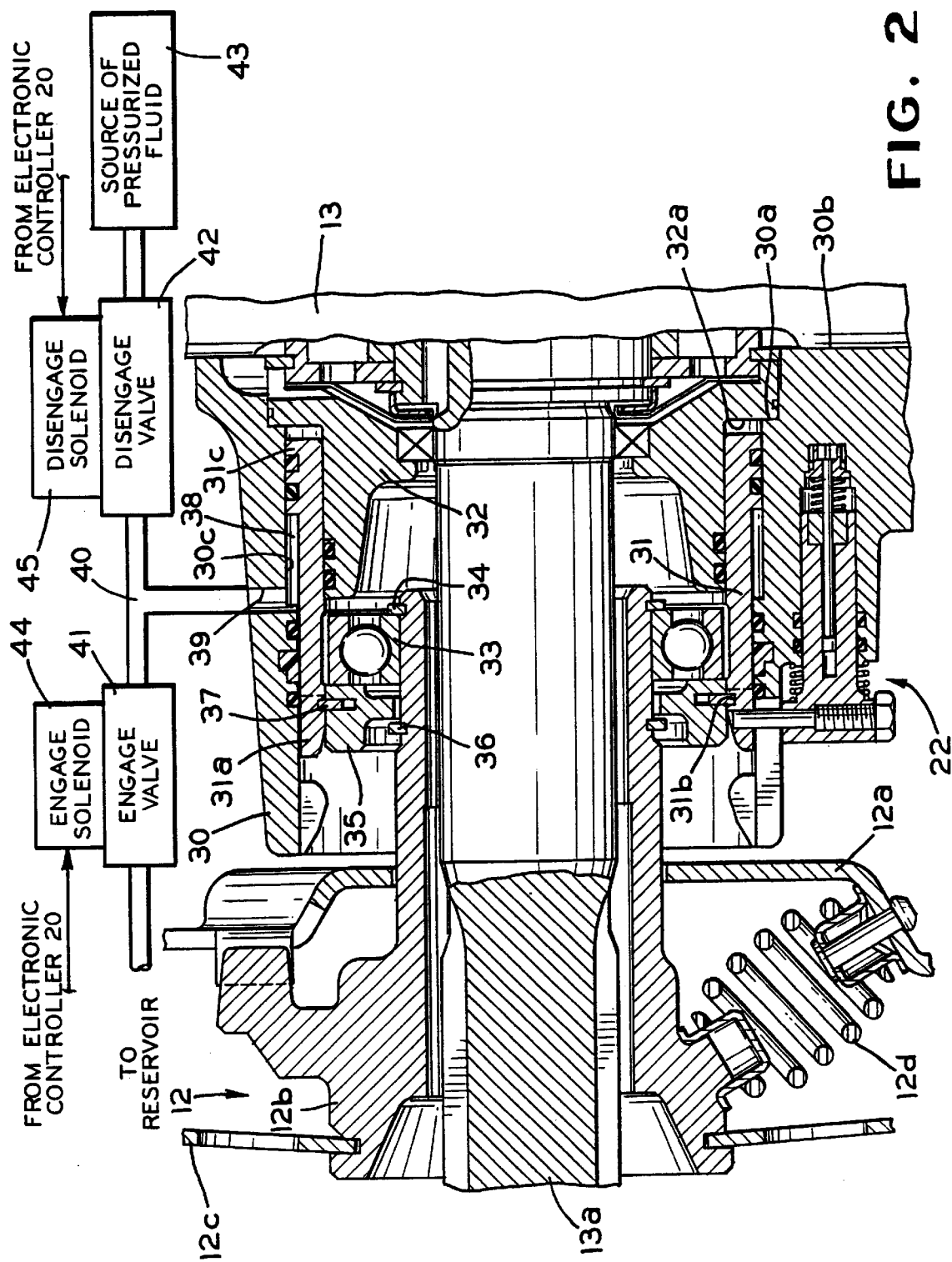
FIG. 2 is sectional elevational view of the clutch actuator and portions of the clutch and transmission illustrated in FIG. 1 showing the clutch actuator and the clutch in a disengaged position, together with a block diagram of the valves and related control circuit for operating the clutch actuator and the clutch.

Referring now to FIG. 2, the clutch actuator 16 and portions of the clutch 12 and the transmission 13 are illustrated in detail. The structure and operation of the clutch actuator 16 are disclosed and illustrated in detail in co-pending application Ser. No. 08/775,460, filed Dec. 30, 1996 (owned by the assigned of this invention), the disclosure of which is incorporated herein by reference. Briefly, however, the clutch actuator 16 includes an outer cylinder housing 30, a hollow cylindrical piston 31, and an inner cylinder housing 32. The piston 31 has at least one, and preferably a plurality, of axially forwardly projecting protrusions 31a, each of which has a circumferentially extending groove 31b formed therein. To assemble the clutch actuator 16, the piston 31 is initially disposed concentrically within the outer cylinder housing 30, and the inner cylinder housing 32 is disposed concentrically within the piston 31. Then, the outer cylinder housing 30 is secured to a forwardly facing surface of a case of the transmission 13 by threaded fasteners (not illustrated) or other means. When this is done, a forwardly facing surface 32a of the inner cylinder housing 32 abuts a complementary shaped, rearwardly facing annular surface 30a formed within the outer cylinder housing 30. At the same time, a rearwardly facing surface 30b of the outer cylinder housing 30 abuts portions of the case of the transmission 13. Thus, the inner cylinder housing 32 is captured between the case of the transmission 13 and the outer cylinder housing 30 so as to be fixed in position relative thereto. At the same time, a circumferential rim portion 31c of the piston 31 is received in an undercut 30c formed in the interior of the outer cylinder housing 30. Thus, the piston 31 is capable of limited axial movement relative to the outer cylinder housing 30 and the inner cylinder housing 32.

The clutch 12 is a conventional pull-to-release type clutch and includes a cover 12a which is connected to a flywheel (not illustrated) which, in turn, is connected to the output shaft 11a of the engine 11. The flywheel and the cover 12a are thus rotatably driven by the engine 11 of the vehicle for rotation about an axis. The cover 12a has a central opening formed therethrough which receives a hollow, generally cylindrical release sleeve 12b. The release sleeve 12b is disposed concentrically about the transmission input shaft 13a. A driven disc assembly (not shown) is mounted within the clutch 12 on the forward end of the transmission input shaft 13a for rotation therewith and for axial movement relative thereto. When the clutch 12 is engaged, torque is transmitted from the driven disc assembly to the transmission input shaft 13a in a known manner. When the clutch 12 is disengaged, no torque is transmitted from the driven disc assembly to the transmission input shaft 13a.

A forward end of the release sleeve 12b has an annular groove formed thereabout which receives the radially innermost ends of a plurality of clutch operating levers 12c therein. Thus, axial movement of the release sleeve 12b causes pivoting movement of the clutch operating levers 12c which, in turn, causes engagement and disengagement of the clutch 12 in a known manner. A plurality of clutch engagement springs 12d (only one of which is illustrated) reacts between the cover 12a and the forward end of the release sleeve 12b. The ends of the clutch engagement springs 12d are preferably supported on respective seats provided on the release sleeve 12b and the cover 12a. The springs 12d urge the release sleeve 12b axially forwardly (toward the left when viewing FIG. 2) toward an engaged position, wherein the components of the clutch 12 are frictionally engaged so as to cause the transmission input shaft 13a to be rotatably driven by the engine 11. When the release sleeve 12b is moved axially rearwardly (toward the right when viewing FIG. 2) against the urging of the engagement springs 12d toward a disengaged position, the components of the clutch 12 are frictionally disengaged so as to prevent the transmission input shaft 13a from being rotatably driven by the engine 11.

The rearward end of the release sleeve 12b extends axially rearwardly through the central opening in the cover 12a. An annular release bearing 33 is disposed about the rearward end of the release sleeve 12b and is retained on one side by a snap ring 34 disposed within an annular groove. A retaining ring 35 is also disposed about the rearward end of the release sleeve 12b adjacent to the forward side of the release bearing 33. A snap ring 36 is disposed in an annular groove in the release sleeve 12b to retain the retaining ring 35 on the release sleeve 12b. Thus, the release bearing 33 and the retaining ring 35 are secured to the release sleeve 12b for axial movement therewith. A snap ring 37 is disposed within the groove formed in the outer surface of the retaining ring 35. The snap ring 37 connects the piston 31 with the retaining ring 35 such that axial movement of the piston 31 causes corresponding axial movement of the retaining ring 35, the release bearing 33, and the release sleeve 12b.

An annular chamber 38 is defined between the outer surface of the body of the piston 31, the enlarged rim portion 31c formed at the rearward end of the piston 31, and the undercut 30c formed in the inner surface of the outer cylinder housing 30. The chamber 38 is sealed to form a fluid-tight chamber by sealing elements, such as O-rings. A radially extending port 39 is formed through the outer cylinder housing 30. As will be explained in detail below, pressurized fluid (hydraulic or pneumatic, as desired) is supplied through the port 39 used to effect axial movement of the piston 31 in one direction relative to the outer cylinder housing 30 and the inner cylinder housing 31.

The clutch position sensor 22 is mounted on the outer cylinder housing 30 for generating an electrical signal which is representative of the axial position of the piston 31 relative to the outer and inner cylinder housings 30 and 32. Such an electrical position signal is used by an electronic controller 20 for automatically operating the clutch actuator 16 in a manner described in detail below. The clutch position sensor 22 is conventional in the art.

The port 39 communicates through a conduit 40 with an engage valve 41 and a disengage valve 42. The engage valve 41 communicates with a reservoir (in hydraulic systems) or the atmosphere (in pneumatic systems), while the disengage valve 42 communicates with a source of pressurized fluid 43, either hydraulic or pneumatic as desired. The operation of the engage valve 41 is controlled by an engage solenoid 44, while the operation of the disengage valve 42 is controlled by a disengage solenoid 45. The engage solenoid 44 and the disengage solenoid 45 are, in turn, connected to the electronic controller 20 so as to be selectively operated thereby.

The clutch 12 is normally maintained in the engaged position under the influence of the engagement springs 12d. When it is desired to disengage the clutch 12, the engage solenoid 44 is actuated by the electronic controller 20 to close the engage valve 41, and the disengage solenoid 45 is actuated by the electronic controller 20 to open the disengage valve 42. As a result, pressurized fluid from the source 43 is supplied to the chamber 38, causing the piston 31 to move rearwardly (toward the 30 right when viewing FIG. 2) against the urging of the engagement springs 12d. As discussed above, such rearward movement of the piston 31 causes the clutch 12 to be disengaged. For several reasons which are well known in the art the disengage valve 42 is operated by the electronic controller 20 in an on-off manner, i.e., either wide open or completely closed.

When it is desired to subsequently re-engage the clutch 12, the engage solenoid 44 is actuated by the electronic controller 20 to open the engage valve 41, and the disengage solenoid 45 is actuated by the electronic controller 20 to close the disengage valve 42. As a result, the chamber 38 is vented to the reservoir, causing the piston 31 to move forwardly (toward the left when viewing FIG. 2) under the influence of the engagement springs 12d. As discussed above, such forward movement of the piston 31 causes the clutch 12 to be engaged. For several reasons which are well known in the art, the engage valve 44 is operated using pulse width modulation techniques to control the engagement of the clutch 12. The electronic controller 20 varies the duty cycle of the pulse width modulation of the engage valve 41 so as to adjust the rate at is which the pressurized fluid in the chamber 38 is vented to the reservoir. By adjusting the rate of venting of the chamber 38 in this manner, the speed at which the release bearing 33 is moved from the disengaged position to the engaged position can be precisely controlled. Precise control of the speed of movement of the release bearing from the disengaged position to the engaged position is important to engage the clutch 12 smoothly and avoid undesirable sudden jerking movement of the vehicle.

As discussed above, the total movement of the release bearing 33 from the disengaged position to the engaged position can be divided into three ranges of movement. The first range of movement of the release bearing 33 is from the disengaged position to a first intermediate position (referred to as the transition point). The transition point is selected to be relatively near, but spaced apart from, the position of the release bearing 33 at which the driven disc assembly of the clutch 12 is initially engaged by the flywheel and the pressure plate. Thus, during this first range of movement (referred to as the transition movement), the clutch 12 is completely disengaged, and no torque is transmitted through the clutch 12 to the transmission 13. The second range of movement of the release bearing 33 is from the transition point to a second intermediate position (referred to as the kiss point). The kiss point is the position of the release bearing 33 at which the driven disc assembly is initially engaged by the flywheel and the pressure plate. Thus, during this second range of movement (referred to as the approach movement) from the transition point to the kiss point, the clutch 12 is disengaged until the release bearing 33 reaches the kiss point, at which point the first measurable amount of torque is transmitted through the clutch 12 to the transmission 13. The third range of movement of the release bearing 33 is from the kiss point to the engaged position. The engaged position is the position of the release bearing 33 at which the driven disc assembly is completely engaged by the flywheel and the pressure plate. Thus, during this third range of movement (referred to as the engagement movement), the clutch 12 is gradually engaged so as to increase the amount of torque which is transmitted through the clutch 12 to the transmission 13 from the first measurable amount at the kiss point to the fill capacity of the clutch 12 at the engaged position.

Movement of the release bearing 33 through the first and second ranges of movement can be accomplished in any known manner. As suggested above, the initial movement of the release bearing 33 from the disengaged position to the transition point can be accomplished by pulse width modulating the engage valve 41 at a predetermined duty cycle so as to cause rapid movement of the release bearing 33 from the disengaged position to the transition point. To accomplish this, the engage valve 41 may be pulse width modulated at a constant rate throughout the transition movement of the release bearing 33. Alternatively, the engage valve 41 may be pulse width modulated at a rate which varies with the current position of the release bearing 33 relative to the transition point so as to decelerate the release bearing 33 somewhat as it approaches the transition point. The electronic controller 20 can be programmed to monitor the clutch position signal from the clutch position sensor 22 to determine when the release bearing 33 has reached the transition point. Regardless of the specific transition rate which is used, it is desirable that the initial transition movement of the release bearing 33 be performed as rapidly as possible because the clutch 12 is completely disengaged throughout. Therefore, no sudden and undesirable engagement of the clutch 12 will occur during this initial transition movement of the release bearing 33.

Similarly, the approach movement of the release bearing 33 from the transition point to the kiss point can be accomplished by pulse width modulation of the engage valve 41 at a duty cycle which is initially relatively long (to initially maintain the rapid movement of the release bearing 33), but subsequently is shortened to decelerate the release bearing 33 as it approaches the kiss point. By slowing the movement of the release bearing 33 as it approaches the kiss point, the clutch 12 will be engaged smoothly so as to prevent the engine from stalling and avoid undesirable sudden jerking movement of the vehicle. The electronic controller 20 can be programmed to automatically alter the duty cycle of the engage valve during this approach movement of the release bearing 33 in response to sensed operating conditions. For example, the electronic controller 20 can be responsive to the amount of depression of the accelerator pedal from the pedal position sensor 24 for adjusting the duty cycle of the engage valve. However, any known algorithms may be used to control the movement of the release bearing 33 in its initial transition movement from the disengaged position to the transition point, and in its subsequent approach movement from the transition point to the kiss point.

The algorithm of this invention relates to the control of the movement of the release bearing 33 in its engagement movement from the kiss point to the engaged position. As discussed above, during the engagement movement of the release bearing 33 from the kiss point to the engaged position, the clutch 12 is gradually engaged so as to increase the amount of torque which is transmitted through the clutch 12 to the transmission 13 from the first measurable amount at the kiss point to the full capacity of the clutch 12 at the engaged position. Thus, although it is desirable that this engagement movement of the release bearing 33 be accomplished as quickly as possible, it is still important to engage the clutch 12 smoothly to prevent the engine from stalling and avoid undesirable sudden jerking movement of the vehicle.

Figure 3:
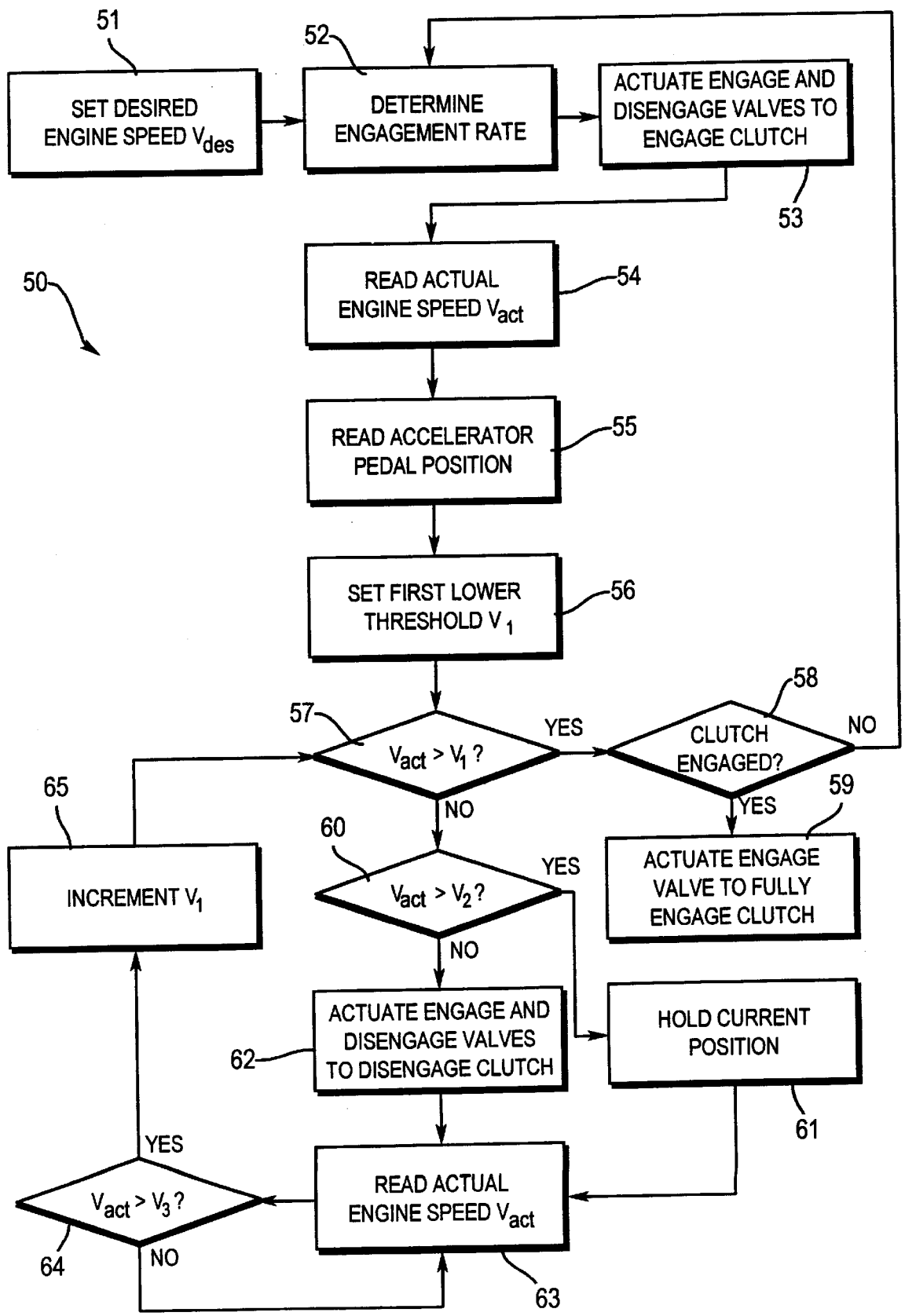
FIG. 3 is a flow chart of an algorithm for controlling the movement of the release bearing of the clutch in its engagement movement from the kiss point to the engaged position.

Referring now to FIG. 3, there is illustrated a flow chart of a first embodiment of an algorithm, indicated generally at 50, for controlling the movement of the release bearing 33 in its engagement movement from the kiss point to the engaged position. In the first step 51 of the algorithm 50, the electronic controller 20 issues a command to the engine controller 23 setting a desired engine speed signal $V_{ENG}$.

The desired engine speed signal $V_{ENG}$ is selected to be sufficiently high such that the engine 11 is capable of overcoming the inertia of the vehicle as the clutch 12 is engaged and thereby avoid stalling during the engagement process. The desired engine speed signal $V_{ENG}$ can, therefore, vary with the specific structure of the engine 11, the transmission 13 used in conjunction with the engine 11, and other factors. The second step 52 of the algorithm 50 is to determine the engagement rate of the release bearing 33 of the lo clutch 12. For the purposes of this invention, the engagement rate can be determined in any conventional manner in response to a number of operating conditions of the vehicle. For example, the engagement rate can be selected to be a constant rate or may vary with the movement of the release bearing 33 from the kiss point to the engaged position in the manner discussed above. As will become apparent below, the algorithm 50 of this invention monitors the status of clutch engagement and alters the predetermined engagement rate under certain circumstances. Then, as shown in the third step 53 of the algorithm 50, the engage valve 41 and the disengage valve 42 are actuated (by means of the respective solenoids 44 and 45) to effect movement of the release bearing 33 of the clutch 12 according to the selected engagement rate. Thus, the clutch engagement process is initiated.

Next the fourth step 54 of the algorithm 50 causes the electronic controller 20 to read the actual engine speed signal $V_{ACT}$ from the engine controller 23. As discussed above, the engine output shaft speed sensor 25 generates the actual engine speed signal $V_{ACT}$ to the engine controller 23 which is representative of the actual rotational speed of the output shaft 11a of the engine 11. That information is available to the electronic controller 20 from the engine controller 23 over the data bus line 26. In the fifth step 55 of the algorithm 50, the electronic controller 20 reads the accelerator pedal position signal from the engine controller 23. As discussed above, the accelerator pedal position sensor 24 generates the accelerator pedal position signal to the engine controller 23 which is representative of the actual position of the accelerator pedal of the vehicle. That information is also available to the electronic controller 20 from the engine controller 23 over the data bus line 26.

The algorithm 60 next enters a sixth step 56 wherein a first lower engine speed threshold signal $V_1$ is generated by the electronic controller 20. The first lower engine speed threshold signal $V_1$ represents an engine speed below which it is undesirable to have the engine 11 operate to avoid even approaching a stalling condition. Thus, the first lower engine speed threshold signal $V_1$ is set somewhat above an engine speed at which stalling of the engine 11 is likely to occur. For example, if the desired engine speed signal $V_{ENG}$ is initially set at approximately 850 r.p.m., the first lower engine speed threshold signal $V_1$ can be set at approximately 600 r.p.m. In this instance, the allowable r.p.m. error between the desired engine speed signal $V_{ENG}$ and the first lower engine speed threshold signal $V_1$ is approximately 250 r.p.m. As a result, so long as the actual engine speed signal $V_{ACT}$ does not drop more than 250 r.p.m. during engagement of the clutch 12 (and, therefore, remains greater than the first lower engine speed threshold signal $V_1$), it can be assumed that the engagement of the clutch 12 can continue at the current rate of engagement without fear of approaching a stalling condition.

If desired, the magnitude of the first lower engine speed threshold signal $V_1$ may vary in response to the accelerator pedal position signal. In this instance, the first lower engine speed threshold signal $V_1$ may be lowered somewhat in accordance with an increase in the accelerator pedal position signal, indicating further depression of the accelerator pedal. In other words, when the accelerator pedal is further depressed by the operator of the vehicle (indicating a desire for a relatively rapid acceleration of the vehicle), the electronic controller 20 may lower the value of first lower engine speed threshold signal $V_1$ and, therefore, increase the allowable r.p.m. error. For example, if the accelerator pedal is sufficiently depressed, the electronic controller 20 may adjust the first lower engine speed threshold signal $V_1$ from 600 r.p.m. to 580 r.p.m. Such an adjustment would accommodate a more aggressive engagement of the clutch 12, while still preventing the likelihood of a stalling condition.

After determining the magnitude of the first lower engine speed threshold signal $V_1$, the algorithm 50 next enters a first decision point 57 wherein the actual engine speed signal $V_{ACT}$ is compared with the first lower engine speed threshold signal $V_1$. if the actual engine speed signal $V_{ACT}$ is greater than the first lower engine speed threshold signal $V_1$, then the actual speed of the engine 11 is being maintained at a normal level during the engagement process of the clutch 12. Thus, the algorithm 50 branches from the first decision point 57 to a second decision point 58 wherein it is determined whether the clutch 12 is fully engaged. This determination can be made by any known method, such as by comparing the rotational speed of the input shaft of the clutch 12 (the output shaft 11a of the engine 11) with the rotational speed of the output shaft of the clutch 12 (the input shaft 13a of the transmission 13). If the rotational speeds of the input and output shafts of the clutch 12 are substantially equal then it can be inferred that the engagement process is substantially completed. Thus, the algorithm 50 branches from the second decision point 58 to a step 59 wherein the engage valve 41 is actuated to interrupt the gradual engagement process and immediately move the release bearing 33 from its current position to the fully engaged position. If the rotational speeds of the input and output shafts of the clutch 12 are not substantially equal then it can be inferred that the engagement process is not yet completed. Thus, the gradual engagement process is continued, and the algorithm 50 branches from the second decision point 58 back to the second step 52. This loop of the algorithm 50 is repeated until the rotational speeds of the input and output shafts of the clutch 12 are substantially equal.

If the actual engine speed signal $V_{ACT}$ is less than or equal to the first lower engine speed threshold signal $V_1$, then the actual speed of the engine 11 has dropped below a normal level during the engagement process of the clutch 12. Thus, the algorithm 50 branches from the first decision point 57 to a third decision point 60 wherein the actual engine speed signal $V_{ACT}$ is compared with a second lower engine speed threshold signal $V_2$. The second lower engine speed threshold signal $V_2$ represents an engine speed below which the engine 11 is likely to stall. Thus, the second lower engine speed threshold signal $V_2$ is set somewhat below the first engine speed threshold signal $V_1$, but still above an engine speed at which stalling of the engine 11 is likely to occur. For example, if the desired engine speed signal $V_{ENG}$ is initially set at approximately 850 r.p.m. and the first lower engine speed threshold signal $V_1$ is set at approximately 600 r.p.m., the second lower engine speed threshold signal $V_2$ can be set at approximately 500 r.p.m. Typically, the second lower engine speed threshold signal $V_2$ is fixed at a predetermined value according to the specifications of the engine 11 and other factors, but may vary with the accelerator pedal position or other factors as desired.

If the actual engine speed signal $V_{ACT}$ is greater than the second lower engine speed threshold signal $V_2$, then the algorithm 50 branches from the third decision 60 to a step 61 wherein the electronic controller 20 interrupts the engagement process and holds the release bearing 33 of the clutch 12 in its current position. Then, the algorithm 50 branches back to the fourth step 54. Thus, it will be appreciated that when the actual engine speed signal $V_{ACT}$ falls below the first lower engine speed threshold signal $V_1$ but remains greater than the second lower engine speed threshold signal $V_2$, further movement of the clutch release bearing 33 is prevented until the actual engine speed signal $V_{ACT}$ recovers to be greater than the first lower engine speed threshold signal $V_1$.

If the actual engine speed signal $V_{ACT}$ is less than or equal to the second lower engine speed threshold signal $V_2$, then a stall condition of the engine 11 is imminent. To prevent this from occurring, the algorithm 50 branches from the third decision 60 to a step 62 wherein the engage valve 41 and the disengage valve 42 are actuated by the electronic controller 20 to immediately disengage the clutch 12. Thus, the algorithm 50 not only interrupts the engagement process, but further aborts the engagement of the clutch 12 and returns the release bearing 33 to the disengaged position.

If desired, the algorithm 50 may return from the step 62 back to the fourth step 54 to attempt to re-start the engagement process by reading the actual engine speed signal $V_{ACT}$ and proceeding forward from that point. However, it has been found to be desirable to introduce a measure of hysteresis into the re-engagement process. To accomplish this, the algorithm 50 may next enter a step 63 wherein the actual engine speed signal $V_{ACT}$ is again read from the speed sensor 25. Then, the actual engine speed signal $V_{ACT}$ is compared with an engagement re-start speed threshold signal $V_3$, as shown in a fourth decision point 64. The engagement re-start speed threshold signal $V_3$ is set to be somewhat above the first lower threshold signal $V_1$. For example, if the desired engine speed signal $V_{ENG}$ is initially set at approximately 850 r.p.m. and the first lower engine speed threshold signal $V_1$ is set at approximately 600 r.p.m., then the engagement re-start speed threshold signal $V_3$ can be set at approximately 750 r.p.m. This higher threshold is desirable to insure a full recovery of the actual engine speed signal $V_{ACT}$ following an imminent stalling condition. If the actual engine speed signal $V_{ACT}$ is less than or equal to the engagement re-start speed threshold signal $V_3$, then the algorithm 50 branches from the fourth decision point 64 back to the step 63. This loop of the algorithm 50 continues until the actual engine speed signal $V_{ACT}$ is greater than the engagement re-start speed threshold signal $V_3$. When this occurs, the algorithm 50 branches from the fourth decision point 64 to a step 65 wherein the magnitude of the first lower threshold signal $V_1$ is incremented. The first lower threshold signal $V_1$ is incremented to minimize the likelihood that an imminent stalling condition will occur during the re-engagement process.

Referring back to step 61, the release bearing 33 of the clutch 12 is held in its current position when the actual engine speed signal $V_{ACT}$ falls below the first lower engine speed threshold signal $V_1$ but remains greater than the second lower engine speed threshold signal $V_2$. Thereafter, the algorithm 50 enters the step 63 wherein the actual engine speed signal $V_{ACT}$ is again read from the speed sensor 25. Then, the actual engine speed signal $V_{ACT}$ is compared with the engagement re-start speed threshold signal $V_3$, as shown in a fourth decision point 64, to introduce a measure of hysteresis into the re-engagement process. If the actual engine speed signal $V_{ACT}$ is less than or equal to the engagement re-start speed threshold signal $V_3$, then the algorithm 50 branches from the fourth decision point 64 back to the step 63. This loop of the algorithm 50 continues until the actual engine speed signal $V_{ACT}$ is greater than the engagement re-start speed threshold signal $V_3$. When this occurs, the algorithm 50 branches from the fourth decision point 64 to the step 65 wherein the magnitude of the first lower threshold signal $V_1$ is incremented. This step 65, which is usually desirable when re-starting the engagement process after an aborted attempt, may be omitted when re-starting the engagement process after merely holding the release bearing 33 of the clutch 12 in its current position for a period of time.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An apparatus for controlling an engagement rate of a clutch having an input member and an output member for selectively connecting an engine to a transmission in a vehicle having an accelerator pedal, the apparatus comprising:

a sensor for generating a signal which is representative of the speed of the engine;

a sensor for generating a signal which is representative of the position of the accelerator pedal;

a controller for generating a control signal which is representative of an engagement rate of the clutch, said controller being responsive to said engine speed sensor signal for modifying said control signal when the engine speed drops below a predetermined level; and a clutch actuator for controlling the engagement rate of the clutch in response to said control signal.

2. The apparatus defined in claim 1 wherein said controller is responsive to said engine speed sensor signal for modifying said control signal when the engine speed drops below said predetermined level so as to cause said clutch actuator to halt further engagement of the clutch.

3. The apparatus defined in claim 1 wherein said controller is responsive to said engine speed sensor signal for modifying said control signal when the engine speed drops below said predetermined level so as to cause said clutch actuator to halt further engagement of the clutch until the engine speed rises above said predetermined level.

4. The apparatus defined in claim 1 wherein said predetermined level is a first predetermined level, and wherein said controller is responsive to said engine speed sensor signal for modifying said control signal when the engine speed drops below said first predetermined level so as to cause said clutch actuator to halt further engagement of the clutch until the engine speed rises above a second predetermined level different from said first predetermined level.

5. The apparatus defined in claim 4 wherein said second predetermined level is greater than said first predetermined level.

6. The apparatus defined in claim 1 wherein said predetermined level is a first predetermined level, and wherein said controller is responsive to said engine speed sensor signal for further modifying said control signal when the engine speed drops below a second predetermined level that is less than said first predetermined level.

7. The apparatus defined in claim 6 wherein said controller is responsive to said engine speed sensor signal for modifying said control signal when the engine speed drops below said first predetermined level so as to cause said clutch actuator to halt further engagement of the clutch.

8. The apparatus defined in claim 6 wherein said controller is responsive to said engine speed sensor signal for modifying said control signal when the engine speed drops below said predetermined level so as to cause said clutch actuator to halt further engagement of the clutch until the engine speed rises above said predetermined level.

9. The apparatus defined in claim 6 wherein said controller is responsive to said engine speed sensor signal for modifying said control signal when the engine speed drops below said first predetermined level so as to cause said clutch actuator to halt further engagement of the clutch until the engine speed rises above a third predetermined level different from said first predetermined level.

10. The apparatus defined in claim 9 wherein said third predetermined level is greater than said first predetermined level.

11. The apparatus defined in claim 6 wherein said controller is responsive to said engine speed sensor signal for modifying said control signal when the engine speed drops below said second predetermined level so as to cause said clutch actuator to disengage the clutch.

12. The apparatus defined in claim 6 wherein said controller is responsive to said engine speed sensor signal for modifying said control signal when the engine speed drops below said second predetermined level so as to cause said clutch actuator to disengage the clutch until the engine speed rises above said second predetermined level.

13. The apparatus defined in claim 6 wherein said controller is responsive to said engine speed sensor signal for modifying said control signal when the engine speed drops below said second predetermined level so as to cause said clutch actuator to disengage the clutch until the engine speed rises above a third predetermined level different from said second predetermined level.

14. The apparatus defined in claim 13 wherein said third predetermined level is greater than said second predetermined level.

15. The apparatus defined in claim 13 wherein said third predetermined level is greater than said first predetermined level.

16. The apparatus defined in claim 1 wherein the output member of the clutch is an input member to the transmission, the transmission further includes an output member, said second sensor generates a signal that is representative of the rotational speed of the output member of the transmission, and said controller is responsive to said signal from said second sensor for calculating the rotational speed of the output member of the clutch.

17. The apparatus defined in claim 1 wherein said controller is responsive to said accelerator pedal sensor signal for modifying said predetermined level in response to movement of the accelerator pedal.

* * * * *